(12) United States Patent
Suer et al.

(10) Patent No.: US 12,200,541 B2
(45) Date of Patent: Jan. 14, 2025

(54) METHODS AND APPARATUSES FOR COMMUNICATION

(71) Applicant: Robert Bosch GmbH, Stuttgart (DE)

(72) Inventors: Marie-Theres Suer, Braunschweig (DE); Christoph Thein, Hildesheim (DE); Hugues Narcisse Tchouankem, Hemmingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 528 days.

(21) Appl. No.: 17/643,364

(22) Filed: Dec. 8, 2021

(65) Prior Publication Data

US 2022/0232418 A1 Jul. 21, 2022

(30) Foreign Application Priority Data

Jan. 19, 2021 (EP) .................................... 21152216

(51) Int. Cl.
*H04W 28/06* (2009.01)
*H04L 47/62* (2022.01)
*H04L 47/726* (2022.01)
*H04W 28/08* (2023.01)
*H04W 28/082* (2023.01)

(52) U.S. Cl.
CPC ......... *H04W 28/06* (2013.01); *H04L 47/6205* (2013.01); *H04L 47/726* (2013.01); *H04W 28/082* (2023.05); *H04W 28/0967* (2020.05)

(58) Field of Classification Search
CPC ............... H04W 28/06; H04W 28/082; H04W 28/0967; H04W 28/0236; H04L 41/0823; H04L 41/0836; H04L 45/245; H04L 47/6205; H04L 47/726; H04L 47/125; H04L 47/58
See application file for complete search history.

(56) References Cited

U.S. PATENT DOCUMENTS

| | | | |
|---|---|---|---|
| 8,848,728 B1 | 9/2014 | Revah et al. | |
| 2015/0295782 A1* | 10/2015 | Ramamoorthy | H04L 69/14 715/736 |
| 2019/0297534 A1* | 9/2019 | Hwang | H04L 47/263 |
| 2020/0274819 A1* | 8/2020 | Nahum | H04L 47/2441 |
| 2023/0164630 A1* | 5/2023 | Lin | H04L 45/306 370/329 |

OTHER PUBLICATIONS

Habib, et al.: "The Past, Present, and Future of Transport-Layer Multipath", arxiv.org, Cornell University Libary, (2016), XP080679858, pp. 1-22.

* cited by examiner

*Primary Examiner* — Omer S Mian
(74) *Attorney, Agent, or Firm* — NORTON ROSE FULBRIGHT US LLP; Gerard A. Messina

(57) ABSTRACT

A method for communication. The method includes receiving or determining an input data stream; propagating the input data stream through a plurality of consecutive input processing stages; and transmitting a plurality of output data streams provided at the output section via a plurality of communication channels.

8 Claims, 6 Drawing Sheets

METHODS AND APPARATUSES FOR COMMUNICATION

CROSS REFERENCE

The present application claims the benefit under 35 U.S.C. § 119 of European Patent Application No. EP 21 15 2216.4 filed on Jan. 19, 2021, which is expressly incorporated herein by reference in its entirety.

BACKGROUND INFORMATION

There are provided advantages in the area of digital communication.

For example, wireless communication systems require lower latency and higher reliability in order to support emerging applications like industrial control, mobile robotics and V2X-services. A measure to enhance the latency and reliability performance of wireless communication systems is Multi-Connectivity (MC) where multiple communication paths are used at the same time. Examples for already existing MC systems are MP-TCP on Transport Layer or Dual Connectivity in 3GPP that can be utilized to enhance the throughput or improve the latency and reliability of the system. The existing MC schemes all offer the option to use a single scheduling scheme over two or multiple paths. For MP-TCP, Packet Duplication (PD) and Load Balancing (LB) are available scheduling options.

SUMMARY

The problems of the related art may be solved by methods according to example embodiments of the present invention and by apparatuses according to example embodiments of the present invention.

According to a first aspect of the present invention, a method is provided that comprises: receiving or determining an input data stream; propagating the input data stream through a plurality of consecutive input processing stages, wherein the input data stream is provided at an input section of the consecutive input processing stages, wherein a plurality of output data streams is provided at an output section of the plurality of consecutive input processing stages, wherein the plurality of input processing stages comprise an increasing number of processing units per processing stage in the direction of the output section, wherein the respective processing unit determines a plurality of output streams based on its input data stream and based on a scheduling scheme that is associated with the respective input processing stage, and wherein the scheduling schemes differ from each other at least between adjacent input processing stages; and transmitting the plurality of output data streams provided at the output section via a plurality of communication channels.

Advantageously, the performance of data communication is increased with respect to efficiency, latency and reliability of the provided multi-connectivity scheduling schemes in the presence of multiple links or communication channels.

According to an advantageous example embodiment of the present invention, the method further comprises: receiving or determining a configuration for the input processing stages, wherein the configuration comprises at least a plurality of associations between one of the input processing stages and one of the plurality of scheduling schemes; and applying the configuration to the plurality of consecutive input processing stages.

Advantageously, the configuration of the processing stages can be adapted by changing the scheduling schemes of the processing stages.

According to an advantageous example embodiment of the present invention, the determining of the configuration comprises: receiving or determining or providing at least one data traffic requirement associated with the input data stream of the consecutive input processing stages; receiving or determining a respective present state of the plurality of communication channels; determining the configuration for the plurality of consecutive input processing stages based on the at least one data traffic requirement and based on the plurality of present states of the plurality of communication channels, wherein the configuration comprises at least a plurality of associations between one of the input processing stages and one of a plurality of scheduling schemes.

Advantageously, the configuration is adapted to the state of the available communication channels. Therefore, the scheduling schemes are adapted to the channel conditions.

According to an advantageous example embodiment of the present invention, the plurality of scheduling schemes comprise: a duplication scheme, wherein an input packet of the respective input data stream is replicated, by means of the respective processing unit, in form of a respective output packet in the plurality of output data streams; a split scheme, wherein the input packet of the respective input data stream is split up, by means of the respective processing unit, into the plurality of output packets of the output data streams; and a distribution scheme, wherein the input packet of the respective input data stream is assigned, by means of the respective processing unit, to one of the plurality of output data streams.

The scheduling schemes provide their advantages together applied one after another according to the processing stages.

According to a second aspect of the present invention, an apparatus comprises: receiving means or determining means for obtaining an input data stream; propagating means for propagating the input data stream through a plurality of consecutive input processing stages, wherein the input data stream is provided at an input section of the consecutive input processing stages, wherein a plurality of output data streams is provided at an output section of the plurality of consecutive input processing stages, wherein the plurality of input processing stages comprise an increasing number of processing units per processing stage in the direction of the output section, wherein the respective processing unit determines a plurality of output streams based on its input data stream and based on a scheduling scheme that is associated with the respective input processing stage, and wherein the scheduling schemes differ from each other at least between adjacent input processing stages; and transmitting means for transmitting the plurality of output data streams provided at the output section via a plurality of communication channels.

According to a third aspect of the present invention, a method is provided that comprises: receiving a plurality of input data streams via a plurality of communication channels; propagating the plurality of input data streams through a plurality of consecutive output processing stages, wherein the plurality of received input data streams is provided at an input section of the consecutive output processing stages, wherein an output data stream is provided at an output section of the plurality of consecutive output processing stages, wherein the plurality of output processing stages comprise a decreasing number of processing units per output processing stage in the direction of the output section, wherein the respective processing unit determines an output data stream based on its plurality of input data streams and based on a scheduling scheme that is associated with the respective output processing stage, and wherein the scheduling schemes differ from each other at least between adjacent output processing stages; and providing the output data stream at the output section.

Advantageously, the performance of data communication is increased with respect to efficiency, latency and reliability of the provided multi-connectivity scheduling schemes in the presence of multiple links or communication channels.

According to an advantageous example embodiment of the present invention, the method further comprises: receiving or determining a configuration for the output processing stages, wherein the configuration comprises at least a plurality of associations between one of the output processing stages and one of the plurality of scheduling schemes; and applying the configuration to the plurality of consecutive output processing stages.

Advantageously, the configuration of the processing stages can be adapted by changing the scheduling schemes of the processing stages.

According to an advantageous example embodiment of the present invention, the determining of the configuration comprises: receiving or determining or providing at least one data traffic requirement associated with the output data stream; receiving or determining a respective present state of the plurality of communication channels; determining the configuration for the plurality of consecutive output processing stages based on the at least one data traffic requirement and based on the plurality of present states of the plurality of communication channels, wherein the configuration comprises at least a plurality of associations between one of the output processing stages and one of a plurality of scheduling schemes.

Advantageously, the configuration is adapted to the state of the available communication channels. Therefore, the scheduling schemes are adapted to the channel conditions.

According to an advantageous example embodiment of the present invention, the plurality of scheduling schemes comprise: a duplication scheme wherein an output packet of an output data stream is determined based on expected duplicate input packets of different input data streams; a split scheme wherein parts of an output packet is determined based on a plurality of input packets, wherein each input packet represents a part of the output packet; a distribution scheme, wherein the output packet of an output data stream is represented by an input packet of one of input data streams.

The scheduling schemes provide their advantages together applied one after another according to the processing stages.

According to a fourth aspect of the present invention, an apparatus is provided that comprises: receiving means for receiving a plurality of input data streams via a plurality of communication channels; propagating means for propagating the plurality of input data streams through a plurality of consecutive output processing stages, wherein the plurality of received input data streams is provided at an input section of the consecutive output processing stages, wherein an output data stream is provided at an output section of the plurality of consecutive output processing stages, wherein the plurality of output processing stages comprise a decreasing number of processing units per output processing stage in the direction of the output section, wherein the respective processing unit determines an output data stream based on its plurality of input data streams and based on a scheduling scheme that is associated with the respective output processing stage, and wherein the scheduling schemes differ from each other at least between adjacent output processing stages; and provisioning means for providing the output data stream at the output section.

According to a sixth aspect of the present invention, a method is provided that comprises: receiving or determining or providing at least one data traffic requirement associated with an input data stream and an output data stream; receiving or determining a respective present state of a plurality of communication channels; determining at least one configuration for a plurality of processing stages based on the at least one data traffic requirement and based on the plurality of presents states of the plurality of communication channels, wherein the at least one configuration comprises a plurality of associations between one of the processing stages and one of a plurality of scheduling schemes; and providing or transmitting the at least one configuration.

According to an advantageous example embodiment of the present invention, the configuration for a plurality of consecutive input processing stages comprises a first order of scheduling schemes, wherein the configuration of a plurality of consecutive output processing stages comprises a second order of scheduling schemes, and wherein the first and second order are inverse to each other.

Advantageously, the configurations provide a cascaded transmission scheme based on multiple connections/communication channels.

According to a seventh aspect of the present invention, an apparatus is provided that comprises: receiving means or determining means or provisioning means for obtaining at least one data traffic requirement associated with an input data stream and an output data stream; receiving means or determining means for obtaining present states of a plurality of communication channels; determining means for determining at least one configuration for a plurality of processing stages based on the at least one data traffic requirement and based on the plurality of presents states of the plurality of communication channels, wherein the at least one configuration comprises a plurality of associations between one of the processing stages and one of a plurality of scheduling schemes; and provisioning means or transmitting means for providing or transmitting the at least one configuration.

DETAILED DESCRIPTION OF EXAMPLE EMBODIMENTS

Figure 1:
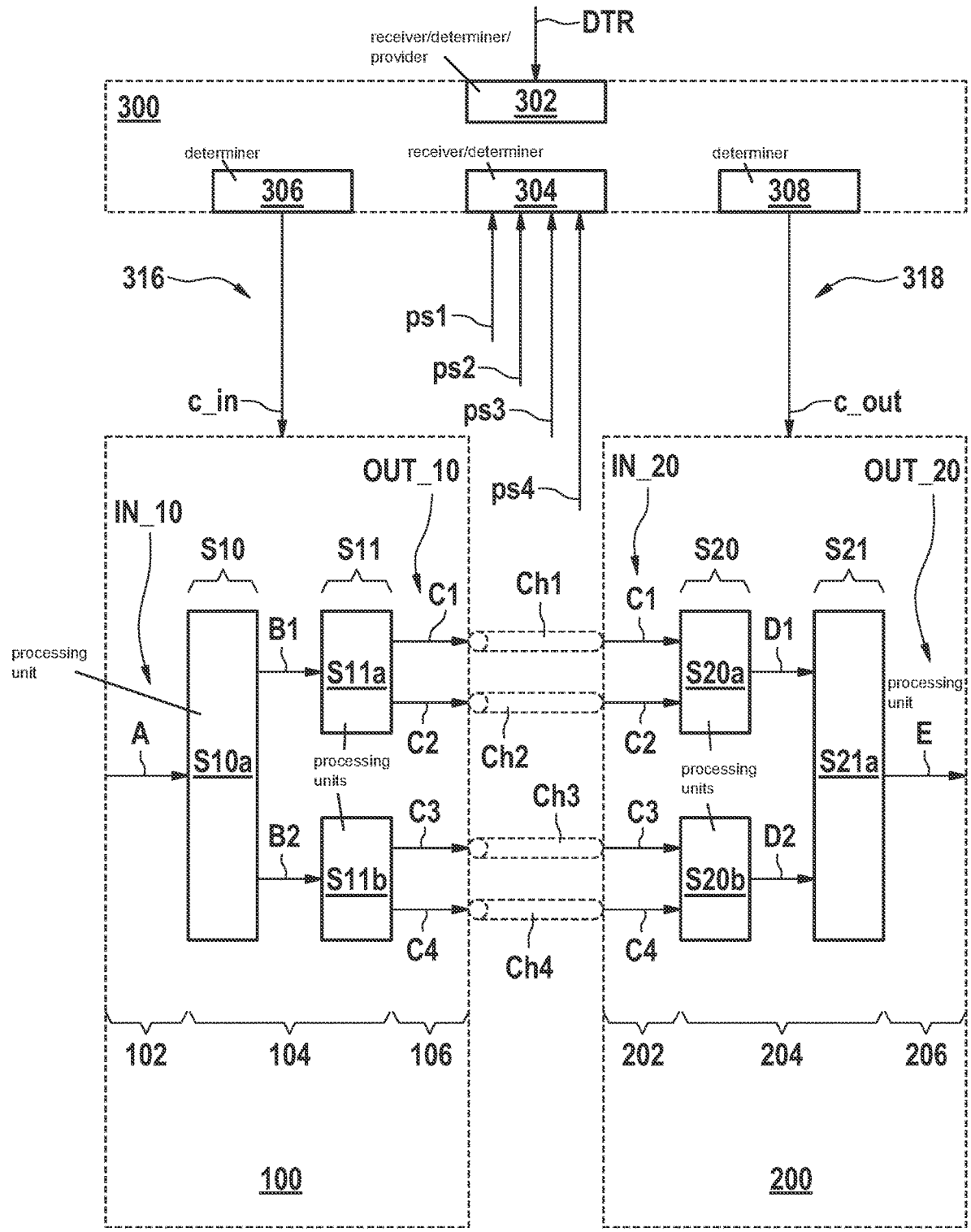
FIG. 1 depicts a schematic block diagram for digital communication, in accordance with an example embodiment of the present invention.

FIG. 1 depicts a schematic block diagram. An apparatus 100 comprises receiving means (receiver) 102 or determining means (determiner) for obtaining an input data stream A. Propagating means (propagator) 104 are provided for propagating the input data stream A through a plurality of consecutive input processing stages S10, S11. The input data stream A is provided at an input section IN_10 of the consecutive input processing stages S10, S11. A plurality of output data streams C1, C2, C3, and C4 is provided at an output section OUT_10 of the plurality of consecutive input processing stages S10, S11. The plurality of input processing stages S10, S11 comprise an increasing number of processing units S10a; S11a, S11b per processing stage S10, S11 in the direction of the output section OUT_10. The respective processing unit S10a, S11a, S11b determines a plurality of output streams B1, B2; C1, C2; C3, C4 based on its input data stream A; B1; B2 and based on a scheduling scheme LB, PD, PS that is associated with the respective input processing stage S10, S11. The scheduling schemes LB, PD, PS differ from each other at least between adjacent input processing stages S10, S11. Transmitting means (transmitter) 106 of the apparatus 100 transmit the plurality of output data streams C1, C2, C3, and C4 provided at the output section OUT_10 via a plurality of communication channels Ch1, Ch2, Ch3, and Ch4.

The plurality of communication channels Ch1, Ch2, Ch3, Ch4 differ in at least one of space, time, frequency and code. For example, the communication channels Ch1-4 are separate radio channels and differ in space and/or frequency. In another example, the communication channels Ch1-4 are communication paths along a network between the apparatuses 100 and 200.

For the apparatus 100, the following applies: A data stream like the input data stream A or the output data stream S1 comprises a plurality of data packets. A data packet comprises at least payload data and may comprise control data. An input processing stage like the input processing stage S10 comprises at least one processing unit. The processing units of the respective input processing stage operate according to a configuration of the plurality of input processing stages, wherein each input processing stage is associated with a single scheduling scheme. The consecutive input processing stages comprise an input data stream and a plurality of output data streams, wherein each one of the input processing stages comprises at least one input data stream and a plurality of output data streams. As the processing stages S10 and S11 have the input data stream A, they are termed input processing stages.

According to an advantageous example, the plurality of communication channels Ch1, Ch2, Ch3, Ch4 are radio links between nodes of a radio communications network. The radio link refers to a connection between two of the plurality of nodes of the radio communications network. The radio link is the physical and/or logical network component used to interconnect nodes in the radio communications network. A link protocol is a suite of methods that operate between adjacent nodes of a network segment of the radio communications network. Each output stream at the output section OUT_10 is assigned to a separate radio link.

According to an advantageous example, the plurality of communication channels Ch1, Ch2, Ch3, Ch4 are data paths along a plurality of network entities of a communication network. The data paths can comprise a different number of nodes, even of different network segments of different communications networks, and a different number of links between the transmitting and the receiving apparatus. For example, multipath routing can be used to determine the plurality of data paths. Then, by means of the apparatus 100, each output stream at the output section OUT_10 is assigned to a separate data path.

Multipath routing is a routing technique simultaneously using multiple alternative paths through a network.

The apparatus 200 comprises receiving means (receiver) 202 for receiving a plurality of input data streams C1, C2, C3, C4 via a plurality of communication channels Ch1, Ch2, Ch3, and Ch4. The apparatus 200 comprises propagating means (propagator) 204 for propagating the plurality of input data streams C1, C2, C3, C4 through a plurality of consecutive output processing stages S20, S21, wherein the plurality of received input data streams C1, C2, C3, C4 is provided at an input section IN_20 of the consecutive output processing stages S20, S21, wherein an output data stream E is provided at an output section OUT_20 of the plurality of consecutive output processing stages S20, S21, wherein the plurality of output processing stages S20, S21 comprise a decreasing number of processing units S20a, S20b, S21a per output processing stage S20, S21 in the direction of the output section OUT_20, wherein the respective processing unit S20a, S20b; S21a determines an output data stream D1; D2; E based on its plurality of input data streams C1, C2, C3, C4; D1, D2 and based on a scheduling scheme LB; PD, PS that is associated with the respective output processing stage S20, S21, and wherein the scheduling schemes LB; PD, PS differ from each other at least between adjacent output processing stages S20, S21. The apparatus 200 comprises provisioning means (provider) 206 for providing the output data stream E at the output section OUT_20.

For the apparatus 200, the following applies: A data stream like the input data stream C1 or the output data stream E comprises a plurality of data packets. A data packet comprises at least payload data and may comprise control data. An output processing stage like the output processing stage S20 comprises at least one processing unit. The processing units of the respective output processing stage operate according to a configuration of the plurality of output processing stages, wherein each output processing stage is associated with a single scheduling scheme. The consecutive output processing stages comprise a plurality of input data streams and at least one output data stream, wherein the number of output data streams reduces towards the output section OUT_20. As the processing stages S20 and S21 determine the output data stream E, they are termed output processing stages.

By applying one of the proposed scheduling schemes on a subset of the available communication channels a new 'virtual' communication channel is created that can be used in a further step as an input to a second stage where an additional scheduling scheme is applied. This method can be referred to as cascaded multi-connectivity. The method can be applied to different combinations to optimize the system with respect to a defined KPI based on the properties of each individual link or communication channel. The proposed communication scheme combines the advantages of multiple different scheduling techniques by cascading them and can thus improve latency and reliability performance of wireless communication systems in particular.

An apparatus 300 is provided for configuring the apparatuses 100 and 200. The apparatus 300 comprises receiving means (receiver) 302 or determining means (determiner) or provisioning means (provider) for obtaining at least one data traffic requirement DTR associated with an input data stream A and an output data stream B. The apparatus 300 further comprises receiving means (receiver) 304 or determining means (determiner) for obtaining present states ps1, ps2, ps3, ps4 of a plurality of communication channels Ch1, Ch2, Ch3, and Ch4. The apparatus comprises determining means (determiners) 306, 308 for determining at least one configuration c_in, c_out for a plurality of processing stages S10, S11; S20, S21 based on the at least one data traffic requirement DTR and based on the plurality of presents states s1, s2, s3, s4 of the plurality of communication channels Ch1, Ch2, Ch3, Ch4, wherein the at least one configuration c_in; c_out comprises a plurality of associations between one of the processing stages S10, S11, S20, S21 and one of a plurality of scheduling schemes LB, PD, PS. Provisioning means (providers) or transmitting means (transmitters) 316, 318 of the apparatus 300 are configured for providing or transmitting the at least one configuration c_in, c_out to the apparatus 100 or 200.

The configuration c_in for a plurality of consecutive input processing stages S10, S11 comprises a first order of scheduling schemes LB, PD, PS, wherein the configuration c_out of a plurality of consecutive output processing stages S20, S21 comprises a second order of scheduling schemes LB, PD, PS, and wherein the first and second order are inverse to each other. Therefore, a cascade of compatible input processing stages S10, S11 and output processing stages S20, S21 are provided.

According to an example, the configuration c_in and/or c_out comprises the order of processing stages and the number of links and their association with the respective scheduling scheme LB, PD or PS.

According to the shown example, the apparatus 300 is separated from the apparatuses 100 and 200. According to another example, the apparatus 300 is part of the apparatus 100 and/or 200.

By cascading different scheduling schemes, their advantages can be combined when multiple communication channels are available. Load Balancing, LB, can reduce the queuing and access latency by increasing the inter-packet-gap (IPG) and thus reducing the load per path. The packet splitting, PS, scheme reduces the payload size per path and can thus reduce the transmission latency. Packet Duplication, PD, increases the diversity by sending a copy of the packet over multiple communication channels.

The apparatus 300 receives traffic requirements and link information as input and selects the channels for operation and which cascaded scheduling scheme is used. It shares this information with the apparatuses 100 and 200. An example architecture is to place the apparatus 300 onto the transmitting apparatus 100 and inform the receiving apparatus 200 of the selected configuration by using a designated field in the packet header.

After initial reception of the requirements of the traffic flow to be scheduled and the information about the present status of the communication channels (e.g. delay statistics, loss rates), the apparatus 300 determines an optimal configuration based on the provided traffic requirement. The configuration is signaled to the apparatuses 100 and 200 afterwards.

If a change in the link conditions/present states or the traffic requirement is observed, a recalculation of the scheduling decision is triggered.

According to an example, a scheduled update of the determination of the configuration is conducted if the link conditions or traffic requirements change to avoid a permanently changing configuration and enable a change of the configuration based on a timing period.

Figure 2:
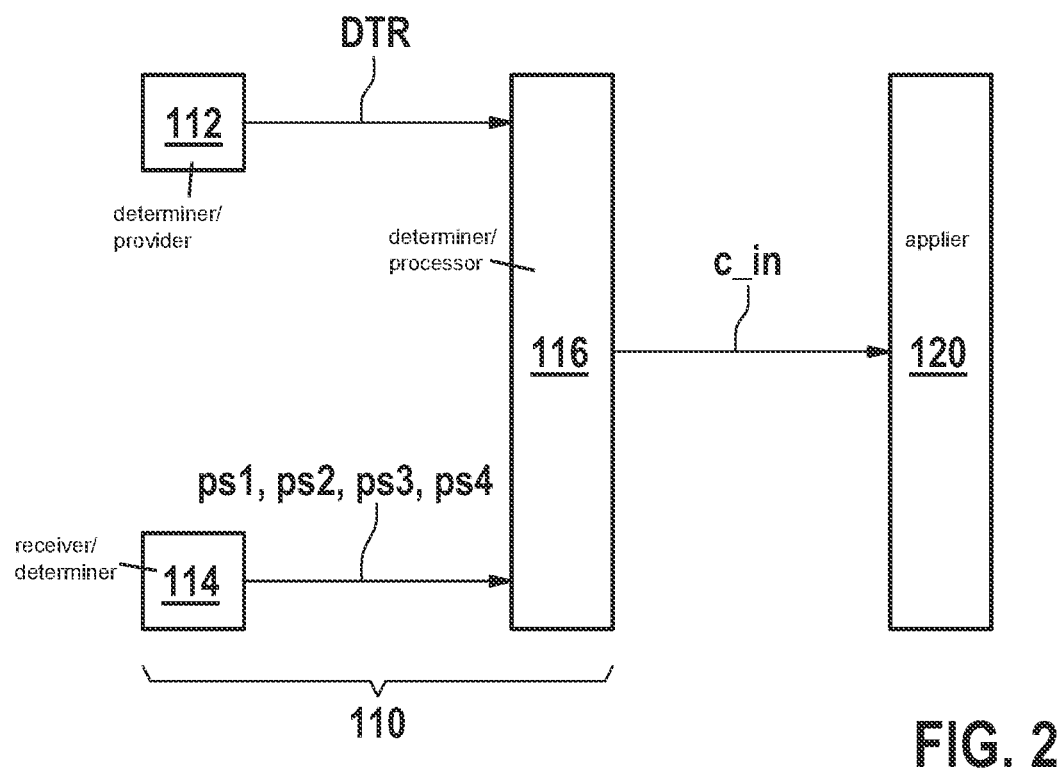
FIGS. 2 and 3 each depicts a schematic block diagram for determining and applying a communication, in accordance with an example embodiment of the present invention.

FIG. 2 depicts a schematic block diagram for configuring the transmitting apparatus 100 of FIG. 1. The apparatus 100 comprises receiving means (receiver) or determining means (determiner) 110 for obtaining a configuration c_in for the input processing stages, wherein the configuration c_in comprises at least a plurality of associations between one of the input processing stages and one of the plurality of scheduling schemes. Applying means (applier) 120 apply the configuration c_in to the plurality of consecutive input processing stages.

The determining means (determiner) 110 comprises receiving means (receiver) or determining means (determiner) or providing means (provider) 112 to provide at least one data traffic requirement DTR associated with the input data stream of the consecutive input processing stages. Receiving means (receiver) 114 or determining means are provided to obtain a respective present state ps1, ps2, ps3, ps4 of the plurality of communication channels.

Determining (determiner) or processing means (processor) 116 are provided to obtain the configuration c_in for the plurality of consecutive input processing stages based on the at least one data traffic requirement DTR and based on the plurality of present states ps1, ps2, ps3, ps4 of the plurality of communication channels, wherein the configuration c_in comprises at least a plurality of associations between one of the input processing stages and one of a plurality of scheduling schemes.

The configuration c_in is determined and applied if the at least one data traffic requirement DTR changes and/or if one of the present stages ps1 to ps4 changes.

Figure 3:
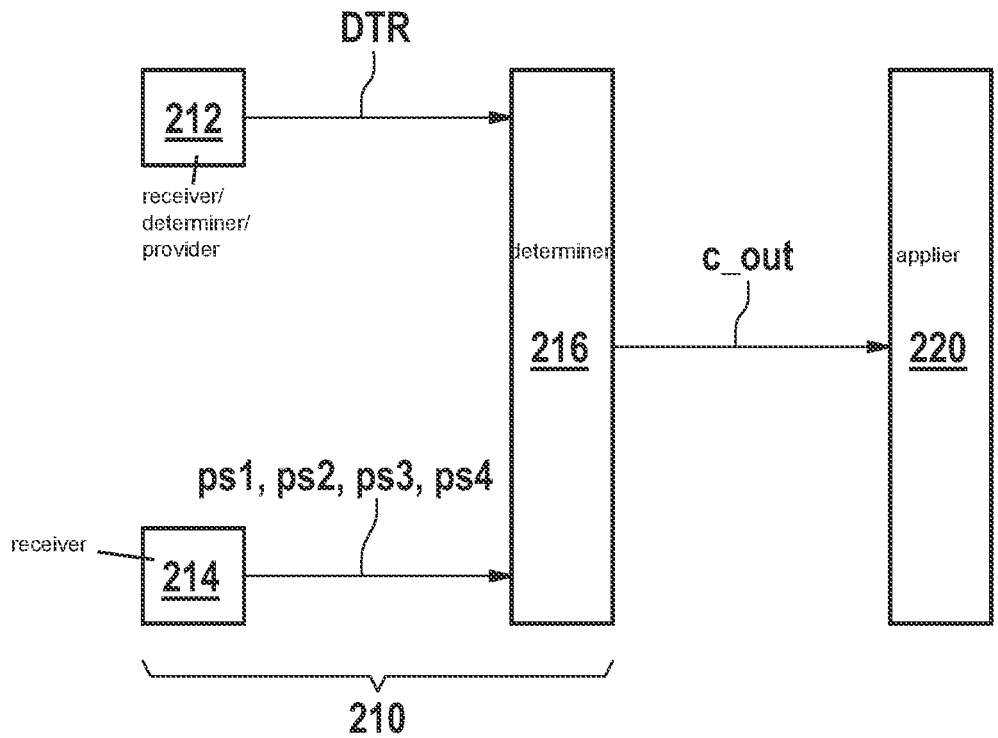

FIG. 3 depicts a schematic block diagram for configuring the receiving apparatus 200 of FIG. 1. Receiving (receiver) or determining means (determiner) 210 obtain a configuration c_out for the output processing stages, wherein the configuration c_out comprises at least a plurality of associations between one of the output processing stages and one of the plurality of scheduling schemes. Applying means (applier) 220 apply the configuration c_out to the plurality of consecutive output processing stages.

The determining means (determiner) 210 comprise: Receiving means (receiver) or determining means (determiner) or providing means (provider) 212 for providing at least one data traffic requirement DTR associated with the output data stream; Receiving means (receiver) 214 or determining means (determiner) to obtain a respective present state ps1, ps2, ps3, ps4 of the plurality of communication channels; and determining means (determiner) 216 for determining the configuration c_out for the plurality of consecutive output processing stages based on the at least one data traffic requirement DTR and based on the plurality of present states ps1, ps2, ps3, ps4 of the plurality of communication channels, wherein the configuration c_out comprises at least a plurality of associations between one of the output processing stages and one of a plurality of scheduling schemes.

The configuration c_out is determined and applied if the at least one data traffic requirement DTR changes and/or if one of the present stages ps1 to ps4 changes.

Figure 4:
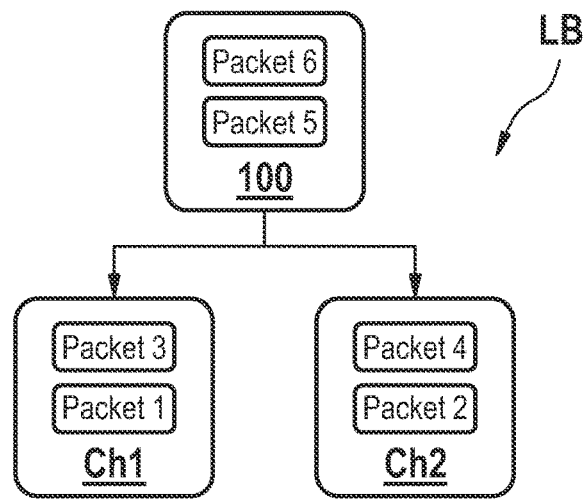
FIGS. 4 to 6 each depict a respective scheduling scheme, in accordance with an example embodiment of the present invention.

FIG. 4 schematically depicts a distribution scheme LB, which can be also termed load balancing scheme. The packets of the input data stream are numbered according to its arrival time. The distribution scheme LB distributes the packets between the communication channels Ch1 and Ch2.

At the transmitting apparatus 100 of FIG. 1, the input packet of the respective input data stream is assigned, by means of the respective processing unit, to one of the plurality of output data streams.

At the receiving apparatus 200 of FIG. 1, an output packet of the respective output data stream is assigned to one of the input packets of the plurality of input data streams, wherein the output packet of an output data stream of a respective processing unit is represented by an input packet of one of input data streams.

Figure 5:
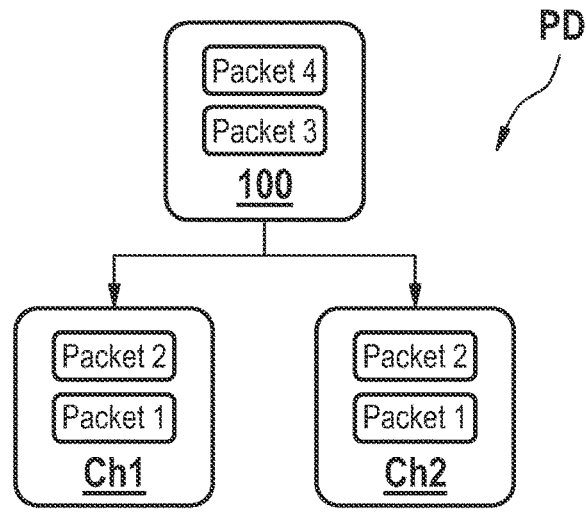

FIG. 5 schematically depicts a duplication scheme PD. The packets of the input data stream are numbered according to its arrival time. The duplication scheme PD duplicates the packets on the communication channels Ch1 and Ch2.

At the transmitting apparatus 100 of FIG. 1, an input packet of the respective input data stream is replicated, by means of the respective processing unit, in form of a respective output packet in the plurality of output data streams.

At the receiving apparatus 200 of FIG. 1, the input packets of a plurality of input data streams are expected to be duplicated at the side of the transmitting apparatus 100 in order to de-duplicate the input packets. An output packet of an output data stream of a respective processing unit is determined based on expected duplicate input packets of different input data streams of the respective processing unit.

Figure 6:
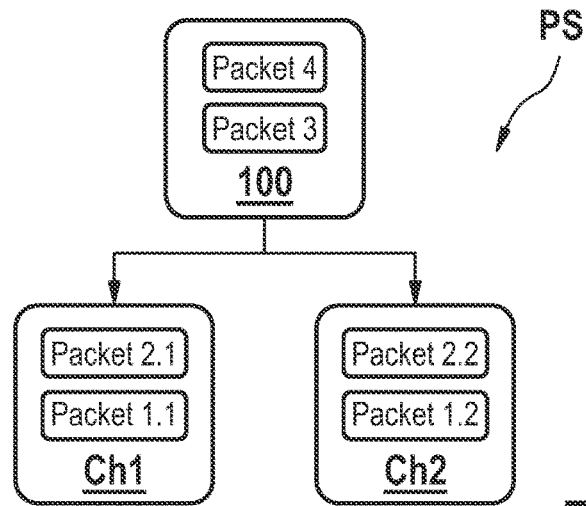

FIG. 6 schematically depicts a split scheme PS. The packets of the input data stream are numbered according to its arrival time. The split scheme PS splits each packet of the input data stream into a plurality of parts, for example packets 1.1 and 1.2, and transmits each part on a different one of the communication channels Ch1 and Ch2.

At the transmitting apparatus 100 of FIG. 1, the input packet of the respective input data stream is split up, by means of the respective processing unit, into the plurality of output packets of the output data streams.

At the receiving apparatus 200 of FIG. 1, the input packets of different input data streams are reassembled on the receiver side and form an output packet of the respective output data stream. The parts of an output packet of a respective processing unit is determined based on a plurality of input packets of the respective processing unit, wherein each input packet represents or comprises a part of the output packet.

Figure 7:
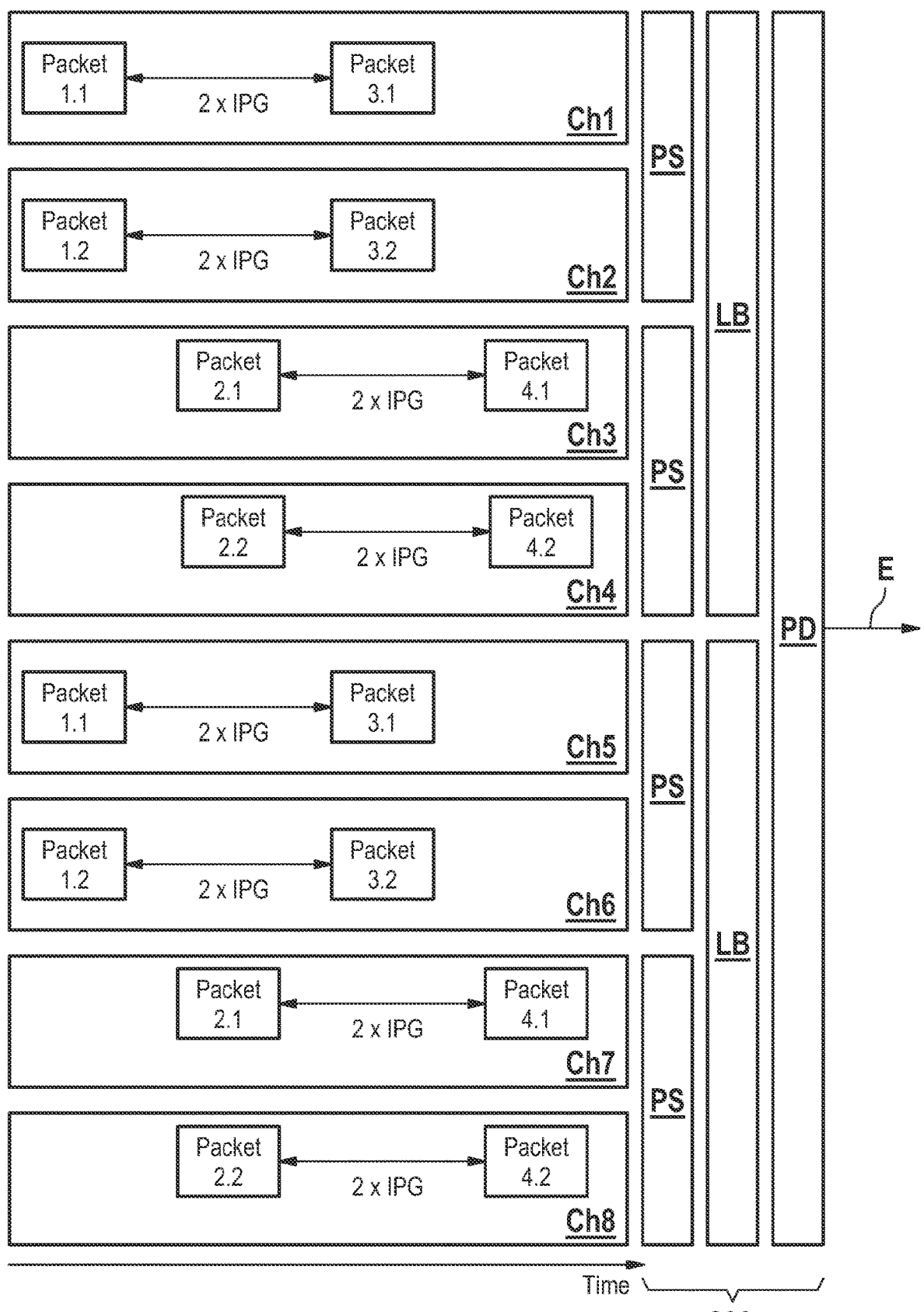
FIG. 7 depicts schematically a combined scheduling scheme, in accordance with an example embodiment of the present invention.

FIG. 7 schematically depicts an example with eight communication channels Ch1 to Ch8 available for use. The receiving apparatus 200 determines the output data stream E based on the input data streams arriving via the different communication channels Ch1 to Ch8. The input data streams pass through a first processing stages operating according to the scheduling scheme PS. The output data streams of the first processing stages are the input data streams of a second processing stage. The second processing stage operates according to the scheduling scheme LB. The output data streams of the second processing stage are the input data streams of the third processing stage that is operating according to the scheduling scheme PD. The third processing stage determines the output data stream E.

This example for a cascaded multi-connectivity scheme provides packet splitting (PS) over two links or communication channels. Load Balancing (LB) is provided over two 'virtual' communication channels provided by two packet splitting processing entities of the first output processing stage. Packed Duplication (PD) is provided over two 'virtual' communication channels provided by two load balancing processing entities of the second output processing stage. In this example the payload size is halved, the inter-packet gap, IPG, is doubled and additionally a diversity degree of two can be reached. This potentially decreases latency and improves reliability.

In an additional example, a lower number of communication channels is selected to increase the efficiency of the communication system, such that the resources could e.g. be used by other applications or other users.

Figure 8:
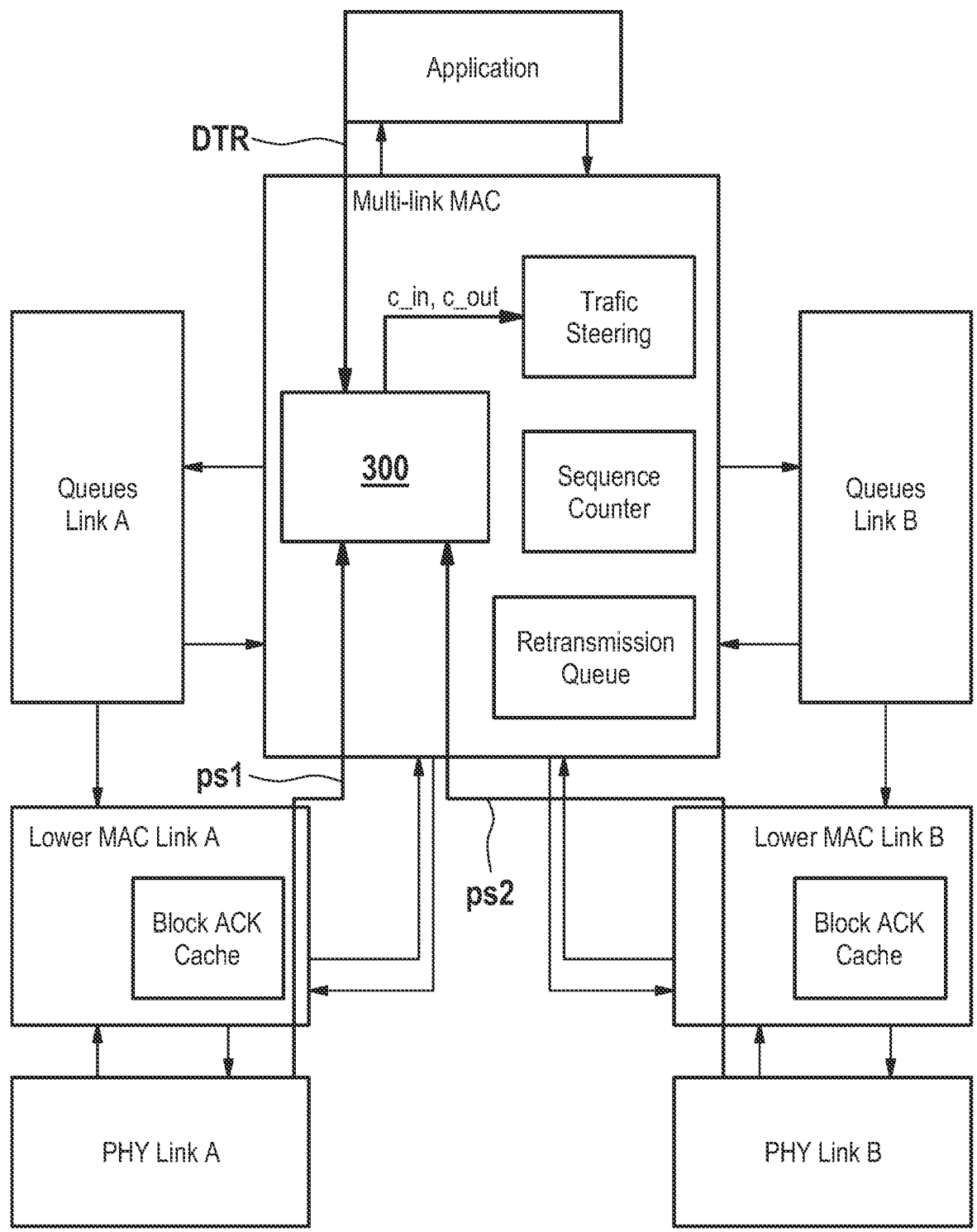
FIG. 8 depicts a first exemplary embodiment of the communication scheme, in accordance with an example embodiment of the present invention.

FIG. 8 depicts schematically a Wi-Fi example. The apparatus 300 is located in the upper MAC. The apparatus 300 selects the cascaded MC scheme in the form of the configurations c_in, c_out and configures the traffic steering. The apparatus 300 receives traffic requirements from the application and link information from PHY and lower MAC in form of present states ps1, ps2. The apparatus 300 uses these input parameters to configure the cascaded MC scheme via the configurations c_in and c_out.

Figure 9:
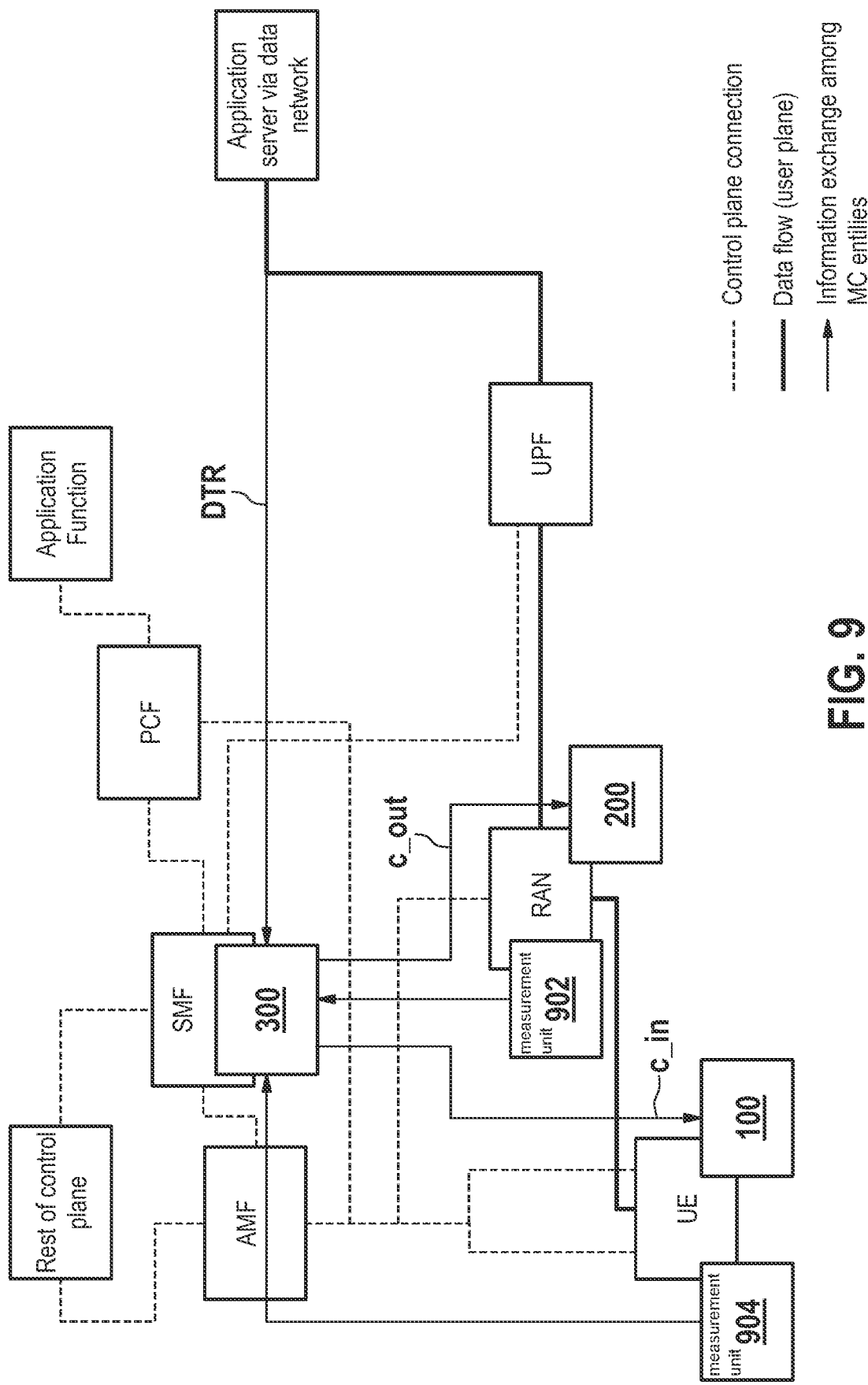
FIG. 9 depicts a second exemplary embodiment of the communication scheme, in accordance with an example embodiment of the present invention.

FIG. 9 depicts schematically a 3GPP architecture. The multi-connectivity (MC) entity is split into a control part and an aggregation part.

The MC control entity in form of the apparatus 300 uses information from collected radio characteristics and potentially also from a pQoS entity to decide which MC scheme or configuration c_in, c_out is used at a given point in time.

The MC control entity in form of the apparatus 300 informs all related units about the used scheme in form of the determined configuration. The apparatus 300 could e.g. be located in the 5G Session Management Function, SMF.

In a shown uplink scenario, the user equipment UE comprises the transmitting apparatus 100, and the radio access node, RAN, comprises the receiving apparatus 200. In a downlink scenario, the user equipment UE comprises the receiving apparatus 200 and the radio access node, RAN, comprise the transmitting apparatus 100.

Measurement units 902 and 904 provide the present status of the communication channels to the apparatus 300.

An MC aggregation entity could include both the functions of the apparatuses 100 and 200. The MC aggregation entity splits and aggregates the different links according to the selected MC scheme. The MC aggregation entity could e.g. be located in the RAN at PDCP Layer and use Dual-Connectivity. The MC aggregation entity could also be located at the MAC Layer and use Carrier Aggregation. The MC aggregation entity could also use multiple RANs (not shown) and reside in the User Plane Function, UPF.

What is claimed is:

1. A method, comprising the following steps:
   receiving or determining an input data stream;
   propagating the input data stream through a plurality of consecutive input processing stages, wherein the input data stream is provided at an input section of the consecutive input processing stages, wherein a plurality of output data streams is provided at an output section of the plurality of consecutive input processing stages, wherein the plurality of input processing stages include an increasing number of processing units per processing stage in a direction of the output section, wherein each respective processing unit of the processing units determines a respective plurality of output streams based on its input data stream and based on a scheduling scheme that is associated with its respective input processing stage, and wherein the scheduling schemes differ from each other at least between adjacent input processing stages, each of the scheduling schemes being one of the following plurality of scheduling schemes: (i) a duplication scheme, wherein each input packet of a respective input data stream is replicated, by means of a respective processing unit, in the form of a respective output packet in the plurality of output data streams of the respective processing unit so that the plurality of output data streams include the same respective output packet, (ii) a split scheme, wherein each input packet of a respective input data stream is split up, by means of a respective processing unit, into a plurality of output packets of the output data streams of the respective processing unit so that the plurality of output data streams include different parts of the input packet, and (iii) a distribution scheme, wherein each input packet of the respective input data stream is assigned, by means of a respective processing unit, to one of the plurality of output data streams of the respective processing unit; and transmitting the plurality of output data streams provided at the output section via a plurality of communication channels.

2. The method according to claim 1, further comprising:
receiving or determining a configuration for the input processing stages, wherein the configuration includes at least a plurality of associations between one of the input processing stages and one of the plurality of scheduling schemes; and
applying the configuration to the plurality of consecutive input processing stages.

3. The method according to claim 2, wherein the determining of the configuration includes:
receiving or determining or providing at least one data traffic requirement associated with the input data stream of the consecutive input processing stages;
receiving or determining a respective present state of the plurality of communication channels; and
determining the configuration for the plurality of consecutive input processing stages based on the at least one data traffic requirement and based on the plurality of present states of the plurality of communication channels, wherein the configuration includes at least a plurality of associations between one of the input processing stages and one of a plurality of scheduling schemes.

4. An apparatus, comprising:
a receiver or determiner configured to obtain an input data stream;
a propagator configured to propagate the input data stream through a plurality of consecutive input processing stages, wherein the input data stream is provided at an input section of the consecutive input processing stages, wherein a plurality of output data streams is provided at an output section of the plurality of consecutive input processing stages, wherein the plurality of input processing stages include an increasing number of processing units per processing stage in a direction of the output section,
wherein each respective processing unit determines a respective plurality of output streams based on its input data stream and based on a scheduling scheme that is associated with its respective input processing stage, and wherein the scheduling schemes differ from each other at least between adjacent input processing stages, each of the scheduling schemes being one of the following plurality of scheduling schemes: (i) a duplication scheme, wherein each input packet of a respective input data stream is replicated, by means of a respective processing unit, in the form of a respective output packet in the plurality of output data streams of the respective processing unit so that the plurality of output data streams include the same respective output packet, (ii) a split scheme, wherein each input packet of a respective input data stream is split up, by means of a respective processing unit, into a plurality of output packets of the output data streams of the respective processing unit so that the plurality of output data streams include different parts of the input packet, and (iii) a distribution scheme, wherein each input packet of the respective input data stream is assigned, by means of a respective processing unit, to one of the plurality of output data streams of the respective processing unit; and
a transmitter configured to transmit the plurality of output data streams provided at the output section via a plurality of communication channels.

5. A method, comprising the following steps:
receiving a plurality of input data streams via a plurality of communication channels;
propagating the plurality of input data streams through a plurality of consecutive output processing stages, wherein the plurality of received input data streams is provided at an input section of the consecutive output processing stages, wherein an output data stream is provided at an output section of the plurality of consecutive output processing stages, wherein the plurality of output processing stages include a decreasing number of processing units per output processing stage in a direction of the output section, wherein each respective processing unit of each respective output processing stage determines a respective output data stream based on a plurality of respective input data streams of the respective processing unit and based on a respective scheduling scheme that is associated with the respective output processing stage, and wherein the scheduling schemes differ from each other at least between adjacent output processing stages, wherein each of the scheduling schemes is one of the following plurality of scheduling schemes: (i) a duplication scheme wherein each output packet of the respective output data stream of the respective processing unit is determined based on expected duplicate input packets of different respective input data streams of the respective processing unit, (ii) a split scheme wherein parts of each output packet of the respective output data stream of the respective processing unit is determined based on a plurality of input packets from the plurality of respective input data streams of the respective processing unit, wherein each input packet of the plurality of input packets represents a part of the output packet; and (iii) a distribution scheme, wherein each output packet of the respective output data stream of the processing unit is represented by an input packet of one of the plurality of respective input data streams of the processing unit; and
providing the output data stream at the output section.

6. The method according to claim 5, further comprising:
receiving or determining a configuration for the output processing stages, wherein the configuration includes at least a plurality of associations between one of the output processing stages and one of the plurality of scheduling schemes; and
applying the configuration to the plurality of consecutive output processing stages.

7. The method according to claim 6, wherein the determining of the configuration includes:
receiving or determining or providing at least one data traffic requirement associated with the output data stream of the output data section;
receiving or determining a respective present state of each of the plurality of communication channels;
determining the configuration for the plurality of consecutive output processing stages based on the at least one data traffic requirement and based on the plurality of present states of the plurality of communication channels, wherein the configuration includes at least a plurality of associations between one of the output processing stages and one of the plurality of scheduling schemes.

8. An apparatus, comprising:

a receiver configured to receive a plurality of input data streams via a plurality of communication channels;

a propagator configured to propagate the plurality of input data streams through a plurality of consecutive output processing stages, wherein the plurality of received input data streams is provided at an input section of the consecutive output processing stages, wherein an output data stream is provided at an output section of the plurality of consecutive output processing stages, wherein the plurality of output processing stages include a decreasing number of respective processing units per output processing stage in the direction of the output section, wherein each respective processing unit of each respective output processing stage determines a respective output data stream based on a plurality of respective input data streams of the respective processing unit and based on a scheduling scheme that is associated with a respective output processing stage of the respective processing unit, and wherein the scheduling schemes differ from each other at least between adjacent output processing stages, wherein each of the scheduling schemes is one of the following plurality of scheduling schemes: (i) a duplication scheme wherein each output packet of the respective output data stream of the respective processing unit is determined based on expected duplicate input packets of different respective input data streams of the respective processing unit, (ii) a split scheme wherein parts of each output packet of the respective output data stream of the respective processing unit is determined based on a plurality of input packets from the plurality of respective input data streams of the respective processing unit, wherein each input packet of the plurality of input packets represents a part of the output packet; and iii) a distribution scheme, wherein each output packet of the respective output data stream of the processing unit is represented by an input packet of one of the plurality of respective input data streams of the processing unit; and a provisioner configured to provide the output data stream at the output section.

* * * * *